(12) United States Patent
Shibata (10) Patent No.: US 12,468,317 B2
(45) Date of Patent: Nov. 11, 2025

(54) FLOW RATE ADJUSTING DEVICE AND CONTROL METHOD OF FLOW RATE ADJUSTING DEVICE

(71) Applicant: Surpass Industry Co., Ltd., Gyoda (JP)

(72) Inventor: Taku Shibata, Saitama (JP)

(73) Assignee: Surpass Industry Co., Ltd., Gyoda (JP)

( * ) Notice: Subject to any disclaimer, the term of this patent is extended or adjusted under 35 U.S.C. 154(b) by 0 days.

(21) Appl. No.: 18/736,609

(22) Filed: Jun. 7, 2024

(65) Prior Publication Data

US 2024/0427356 A1     Dec. 26, 2024

(30) Foreign Application Priority Data

Jun. 23, 2023  (JP) ................................ 2023-103459

(51) Int. Cl.
| | |
|---|---|
| *G05D 7/06* | (2006.01) |
| *F16K 37/00* | (2006.01) |
| *G01F 15/00* | (2006.01) |

(52) U.S. Cl.
CPC ......... *G05D 7/0635* (2013.01); *F16K 37/005* (2013.01); *F16K 37/0091* (2013.01); *G01F 15/005* (2013.01)

(58) Field of Classification Search
CPC ............... G05D 7/0623; G05D 7/0635; Y10T 137/7761; G01F 15/005; F16K 37/005; F16K 37/0091
USPC .................................................... 137/487.5
See application file for complete search history.

(56) References Cited

U.S. PATENT DOCUMENTS

| | | | | |
|---|---|---|---|---|
| 2,962,593 | A * | 11/1960 | Thomas ............... | G05D 16/024 313/7 |
| 10,725,484 | B2 * | 7/2020 | L'Bassi ..................... | G01F 1/36 |
| 11,300,983 | B2 * | 4/2022 | Somani ................ | G05D 7/0623 |
| 11,327,510 | B2 * | 5/2022 | Smirnov ............... | G01F 15/005 |
| 11,583,881 | B2 * | 2/2023 | Kuehler ................ | B05B 12/004 |
| 11,693,435 | B2 * | 7/2023 | Martinez ............ | G05B 19/0426 700/283 |
| 11,733,081 | B2 * | 8/2023 | Marath Sankarathodi ................. | G01F 25/17 73/1.16 |
| 11,994,885 | B2 * | 5/2024 | Li ......................... | G05D 7/0623 |
| 12,123,506 | B2 * | 10/2024 | Koerner ................ | F24H 15/144 |

(Continued)

FOREIGN PATENT DOCUMENTS

JP          2017-138200 A     8/2017

*Primary Examiner* — William M Mccalister
(74) *Attorney, Agent, or Firm* — Troutman Pepper Locke LLP (57) ABSTRACT

Provided is a flow rate adjusting device including: an ultrasonic flow metering portion; a flow rate adjusting portion; a flow rate setting unit; a flow rate fluctuation state detecting unit configured to detect a flow rate fluctuation state where a first flow rate state where a measured flow rate value is higher by at least a first threshold than the set flow rate value and a second flow rate state where the measured flow rate value is lower by at least a second threshold than the set flow rate value occur; and a control device. The control device controls the flow rate adjusting portion to move the valve body by a first motion amount when no flow rate fluctuation state is detected and controls flow rate adjusting portion to move the valve body by a second motion amount less than first motion amount when flow rate fluctuation state is detected.

10 Claims, 9 Drawing Sheets

(56) References Cited

U.S. PATENT DOCUMENTS

| | | | |
|---|---|---|---|
| 12,152,927 B2* | 11/2024 | Hall | G01F 1/42 |
| 12,287,655 B2* | 4/2025 | Ding | G01F 1/86 |
| 2009/0277516 A1* | 11/2009 | Winkler | F04B 49/065 |
| | | | 137/486 |
| 2013/0042929 A1* | 2/2013 | Todaka | F16K 31/003 |
| | | | 137/468 |
| 2016/0161956 A1* | 6/2016 | Baca | F15B 20/00 |
| | | | 137/487.5 |
| 2017/0220051 A1 | 8/2017 | Inoue | |
| 2017/0293309 A1* | 10/2017 | Kishine | G05D 16/0663 |
| 2020/0042021 A1* | 2/2020 | Somani | G01F 1/363 |
| 2022/0163983 A1* | 5/2022 | Shakudo | G05B 11/36 |
| 2022/0187856 A1* | 6/2022 | Toyomasu | B24B 37/04 |
| 2023/0110597 A1* | 4/2023 | Beavis | F04B 49/065 |
| | | | 222/52 |
| 2023/0137252 A1* | 5/2023 | Yada | G05D 7/0623 |
| | | | 131/329 |
| 2023/0383734 A1* | 11/2023 | Beavis | G05D 7/0676 |

* cited by examiner

FLOW RATE ADJUSTING DEVICE AND CONTROL METHOD OF FLOW RATE ADJUSTING DEVICE

CROSS-REFERENCE TO RELATED APPLICATIONS

This application claims foreign priority benefits under U.S.C. § 119 to Japanese Patent Application No. 2023-103459 filed on Jun. 23, 2023, the contents of which is hereby incorporated by reference in its entirety.

BACKGROUND

1. Technical Field

The present disclosure relates to a flow rate adjusting device and a control method of a flow rate adjusting device.

2. Description of Related Art

Flow rate adjusting devices that includes a flow metering portion configured to measure the flow rate of a liquid and moves a valve body in a direction closer to or away from a valve hole to adjust the flow rate of a liquid passing through the valve hole so that the flow rate measured by the flow metering portion is a set flow rate set in advance are conventionally known (see, for example, Japanese Patent Application Laid-Open No. 2017-138200).

However, for example, when a pressure in ejecting a liquid downstream of a flow rate adjusting device (a back pressure) is excessively lower relative to a supply pressure of a liquid upstream of the flow rate adjusting device or when a supply pressure of a liquid upstream of a flow rate adjusting device is excessively higher relative to a pressure in ejecting the liquid downstream of the flow rate adjusting device (a back pressure), the flow rate of the liquid passing through the valve hole increases excessively. In such a case, a phenomenon in which a measured value of a flow rate of a liquid passing through the flow rate adjusting device is excessively larger relative to a set flow rate value set in advance (that is, an overshoot) may occur.

Further, once overshoot occurs, the flow rate of the liquid passing through the valve hole may then be excessively reduced so as to make the measured flow rate value closer to the set flow rate value, and the measured flow rate value may be excessively smaller than the set flow rate value. In such a case, a phenomenon in which states where the measured flow rate value is excessively larger and excessively smaller relative to the set flow rate value are repeated (a hunching phenomenon) may occur resulting in a state where the measured flow rate value does not converge to the set flow rate value.

BRIEF SUMMARY

The present disclosure has been made in view of such circumstances and intends to provide a flow rate adjusting device and a control method of a flow rate adjusting device that can suitably converge the measured flow rate value to a set flow rate value even in a state where a pressure in ejecting a liquid downstream of the flow rate adjusting device (a back pressure) is excessively lower relative to a supply pressure of a liquid upstream of the flow rate adjusting device.

The present disclosure employs the following solutions in order to solve the problem described above.

A flow rate adjusting device according to the first aspect of the present disclosure includes: a flow metering portion configured to measure a flow rate of a liquid flowing into a measurement flow channel from an inflow port and flowing through the measurement flow channel; a flow rate adjusting portion configured to move a valve body along an axis in a direction closer to or away from a valve hole to adjust a flow rate of a liquid flowing out from downstream of the measurement flow channel to an outflow port; a flow rate setting unit configured to set a set flow rate value included in a flow rate range of a minimum flow rate to a maximum flow rate; a flow rate fluctuation state detecting unit configured to detect a flow rate fluctuation state where a first flow rate state and a second flow rate state occur, the first flow rate state being a state where a measured flow rate value measured by the flow metering portion is higher by at least a first threshold than the set flow rate value, and the second flow rate state being a state where the measured flow rate value is lower by at least a second threshold than the set flow rate value; and a control unit configured to control the flow rate adjusting portion so as to move the valve body by a motion amount in accordance with a flow rate difference between the measured flow rate value and the set flow rate value so that the measured flow rate value measured by the flow metering portion is the set flow rate value. The control unit controls the flow rate adjusting portion so as to move the valve body by a first motion amount as the motion amount when the flow rate fluctuation state is not detected by the flow rate fluctuation state detecting unit, and the control unit controls the flow rate adjusting portion so as to move the valve body by a second motion amount as the motion amount, the second motion amount being less than the first motion amount, when the flow rate fluctuation state is detected by the flow rate fluctuation state detecting unit.

According to the flow rate adjusting device of the first aspect of the present disclosure, when the flow rate fluctuation state is not detected by the flow rate fluctuation state detecting unit, the control unit controls the flow rate adjusting portion so as to move the valve body by the first motion amount. In contrast, when the flow rate fluctuation state is detected by the flow rate fluctuation state detecting unit, the control unit controls the flow rate adjusting portion so as to move the valve body by the second motion amount that is less than the first motion amount. Since the second motion amount of the valve body when the flow rate fluctuation state is detected by the flow rate fluctuation state detecting unit is less than the first motion amount of the valve body when the flow rate fluctuation state is detected by the flow rate fluctuation state detecting unit, the change in the flow rate of a liquid flowing through the measurement flow channel is reduced, and adjustment is made so that the first flow rate state and the second flow rate state where the measured flow rate value is excessively larger and excessively smaller, respectively, relative to the set flow rate value set in advance are not repeated. Thus, even in a state where the pressure in ejecting a liquid downstream of the flow rate adjusting device (a back pressure) is excessively lower relative to the supply pressure of a liquid upstream of the flow rate adjusting device, the measured flow rate value can be suitably converged to the set flow rate value.

The flow rate adjusting device according to the second aspect of the present disclosure is further configured as follows in the first aspect. That is, the flow rate fluctuation state is a state where the first flow rate state and the second flow rate state are repeated alternatingly.

According to the flow rate adjusting device of the second aspect of the present disclosure, by detecting, as the flow rate fluctuation state, a state where the first flow rate state and the second flow rate state are repeated alternatingly, it is possible to prevent repetition of the first flow rate state and the second flow rate state where the measured flow rate value is excessively larger and excessively smaller, respectively, relative to the set flow rate value set in advance.

The flow rate adjusting device according to the third aspect of the present disclosure is further configured as follows in the first aspect or the second aspect. That is, the first threshold and the second threshold are set to be greater than or equal to 5% and less than or equal to 10% of the flow rate range.

According to the flow rate adjusting device of the third aspect of the present disclosure, by setting the first threshold and the second threshold to be greater than or equal to 5% and less than or equal to 10% of the flow rate range in which the set flow rate value is set, it is possible to suitably detect the first flow rate state and the second flow rate state where the measured flow rate value is excessively larger and excessively smaller, respectively, relative to the set flow rate value set in advance.

The flow rate adjusting device according to the fourth aspect of the present disclosure is further configured as follows in the first aspect or the second aspect. That is, in response to the flow rate setting unit changing the set flow rate value, the flow rate fluctuation state detecting unit releases a state for detecting the flow rate fluctuation state.

According to the flow rate adjusting device of the fourth aspect of the present disclosure, in response to the flow rate setting unit changing the set flow rate value, the state for detecting the flow rate fluctuation state is released. Thus, the flow rate fluctuation state detecting unit can detect the flow rate fluctuation state again in accordance with the changed set flow rate value.

The flow rate adjusting device according to the fifth aspect of the present disclosure is further configured as follows in the first aspect or the second aspect. That is, the second motion amount is 0.2 times or greater and 0.4 times or less of the first motion amount.

According to the flow rate adjusting device of the fifth aspect of the present disclosure, because the second motion amount is 0.2 times or greater and 0.4 times or less of the first motion amount, the second motion amount of the valve body when the flow rate fluctuation state is detected by the flow rate fluctuation state detecting unit can be suitably reduced relative to the first motion amount, and the fluctuation of the measured flow rate value can be suppressed.

In a control method of a flow rate adjusting device according to the sixth aspect of the present disclosure, the flow rate adjusting device has a flow metering portion configured to measure a flow rate of a liquid flowing into a measurement flow channel from an inflow port and flowing through the measurement flow channel, a flow rate adjusting portion configured to move a valve body along an axis in a direction closer to or away from a valve hole to adjust a flow rate of a liquid flowing out from downstream of the measurement flow channel to an outflow port, and a flow rate setting unit configured to set a set flow rate value included in a flow rate range of a minimum flow rate to a maximum flow rate. The control method includes: a flow rate fluctuation state detection step of detecting a flow rate fluctuation state where a first flow rate state and a second flow rate state occur multiple times, the first flow rate state being a state where a measured flow rate value measured by the flow metering portion is higher by at least a first threshold than the set flow rate value, and the second flow rate state being a state where the measured flow rate value is lower by at least a second threshold than the set flow rate value; and a control step of controlling the flow rate adjusting portion so that the measured flow rate value measured by the flow metering portion is the set flow rate value, and when the flow rate fluctuation state is not detected in the flow rate fluctuation state detection step, the flow rate adjusting portion is controlled in the control step so as to move the valve body by a first motion amount, the first motion amount being in accordance with a flow rate difference between the measured flow rate value and the set flow rate value, and when the flow rate fluctuation state is detected in the flow rate fluctuation state detection step, the flow rate adjusting portion is controlled in the control step so as to move the valve body by a second motion amount, the second motion amount being less than the first motion amount.

According to the control method of the flow rate adjusting device of the sixth aspect of the present disclosure, when the flow rate fluctuation state is not detected in the flow rate fluctuation state detection step, the flow rate adjusting portion is controlled in the control step so as to move the valve body by the first motion amount. In contrast, when the flow rate fluctuation state is detected in the flow rate fluctuation state detection step, the flow rate adjusting portion is controlled in the control step so as to move the valve body by the second motion amount that is less than the first motion amount. Since the second motion amount of the valve body when the flow rate fluctuation state is detected in the flow rate fluctuation state detection step is less than the first motion amount of the valve body when the flow rate fluctuation state is detected in the flow rate fluctuation state detection step, the change in the flow rate of a liquid flowing through the measurement flow channel is reduced, and adjustment is made so that the first flow rate state and the second flow rate state where the measured flow rate value is excessively larger and excessively smaller, respectively, relative to the set flow rate value set in advance are not repeated. Thus, even in a state where the pressure in ejecting a liquid downstream of the flow rate adjusting device (a back pressure) is excessively lower relative to the supply pressure of a liquid upstream of the flow rate adjusting device, the measured flow rate value can be suitably converged to the set flow rate value.

The control method of the flow rate adjusting device according to the seventh aspect of the present disclosure is further configured as follows in the sixth aspect. That is, the flow rate fluctuation state is a state where the first flow rate state and the second flow rate state are repeated alternatingly.

According to the control method of the flow rate adjusting device of the seventh aspect of the present disclosure, by detecting, as the flow rate fluctuation state, a state where the first flow rate state and the second flow rate state are repeated alternatingly, it is possible to prevent repetition of the first flow rate state and the second flow rate state where the measured flow rate value is excessively larger and excessively smaller, respectively, relative to the set flow rate value set in advance.

The control method of the flow rate adjusting device according to the eighth aspect of the present disclosure is further configured as follows in the sixth aspect or the seventh aspect. That is, the first threshold and the second threshold are set to be greater than or equal to 5% and less than or equal to 10% of the flow rate range.

According to the control method of the flow rate adjusting device of the eighth aspect of the present disclosure, by setting the first threshold and the second threshold to be greater than or equal to 5% and less than or equal to 10% of the flow rate range in which the set flow rate value is set, it is possible to suitably detect the first flow rate state and the second flow rate state where the measured flow rate value is excessively larger and excessively smaller, respectively, relative to the set flow rate value set in advance.

The control method of the flow rate adjusting device according to the ninth aspect of the present disclosure is further configured as follows in the sixth aspect or the seventh aspect. That is, in the flow rate fluctuation state detection step, in response to the flow rate setting unit changing the set flow rate value, a state for detecting the flow rate fluctuation state is switched to a state for not detecting the flow rate fluctuation state.

According to the control method of the flow rate adjusting device of the ninth aspect of the present disclosure, in response to the flow rate setting unit changing the set flow rate value, the state for detecting the flow rate fluctuation state is switched to a state for not detecting the flow rate fluctuation state. It is thus possible to detect the flow rate fluctuation state again in accordance with the changed set flow rate value in the flow rate fluctuation state detection step.

The control method of the flow rate adjusting device according to the tenth aspect of the present disclosure is further configured as follows in the sixth aspect or the seventh aspect. That is, the second motion amount is 0.2 times or greater and 0.4 times or less of the first motion amount.

According to the control method of the flow rate adjusting device of the tenth aspect of the present disclosure, because the second motion amount is 0.2 times or greater and 0.4 times or less of the first motion amount, the second motion amount of the valve body when the flow rate fluctuation state is detected in the flow rate fluctuation state detection step can be suitably reduced relative to the first motion amount, and the fluctuation of the measured flow rate value can be suppressed.

According to the present disclosure, it is possible to provide a flow rate adjusting device and a control method of a flow rate adjusting device that can suitably converge a measured flow rate value to a set flow rate value even in a state where a pressure in ejecting a liquid downstream of the flow rate adjusting device (a back pressure) is excessively lower relative to a supply pressure of a liquid upstream of the flow rate adjusting device.

DETAILED DESCRIPTION

Figure 1:
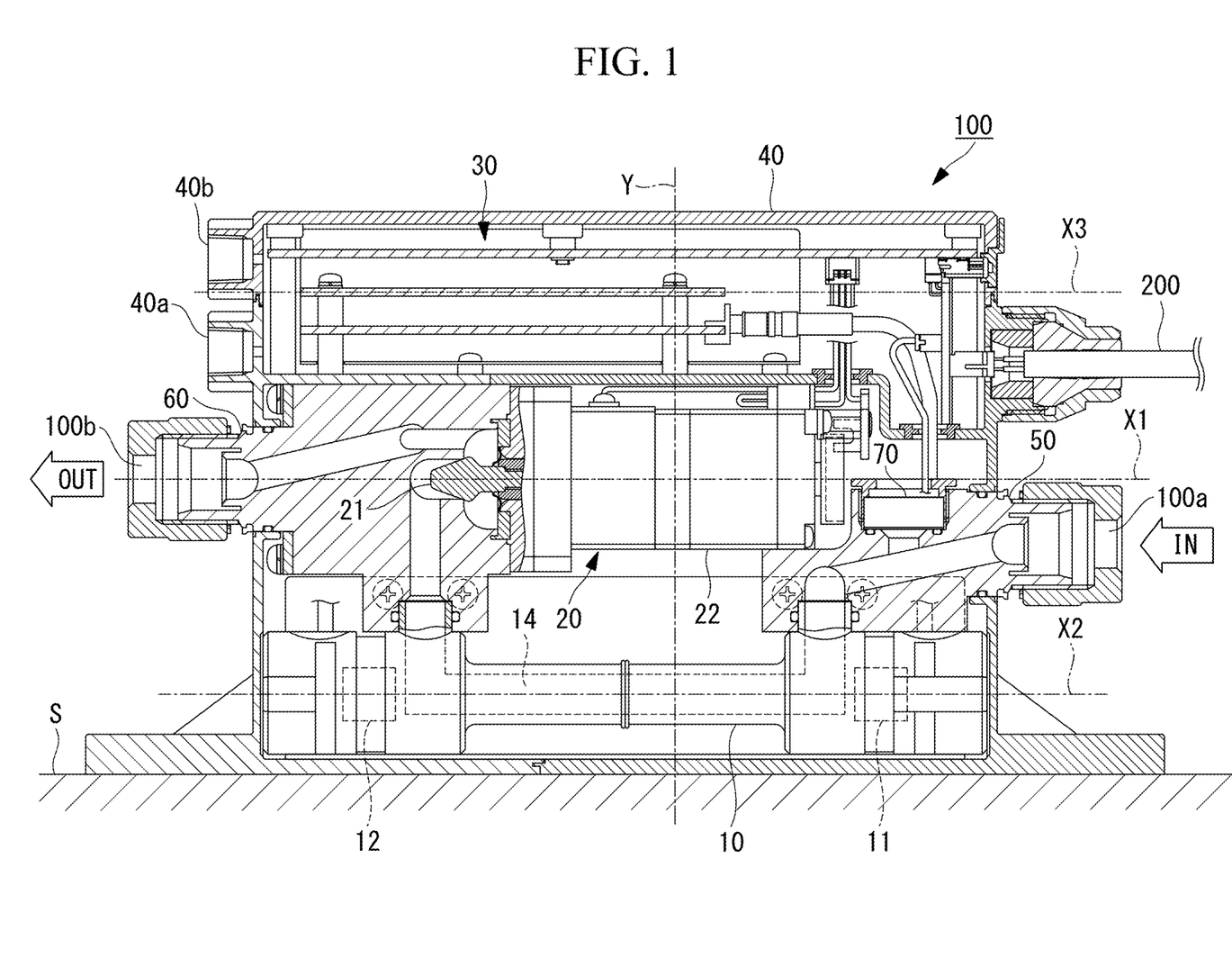
FIG. 1 is a partial longitudinal sectional view illustrating one embodiment of a flow rate adjusting device.
Figure 2:
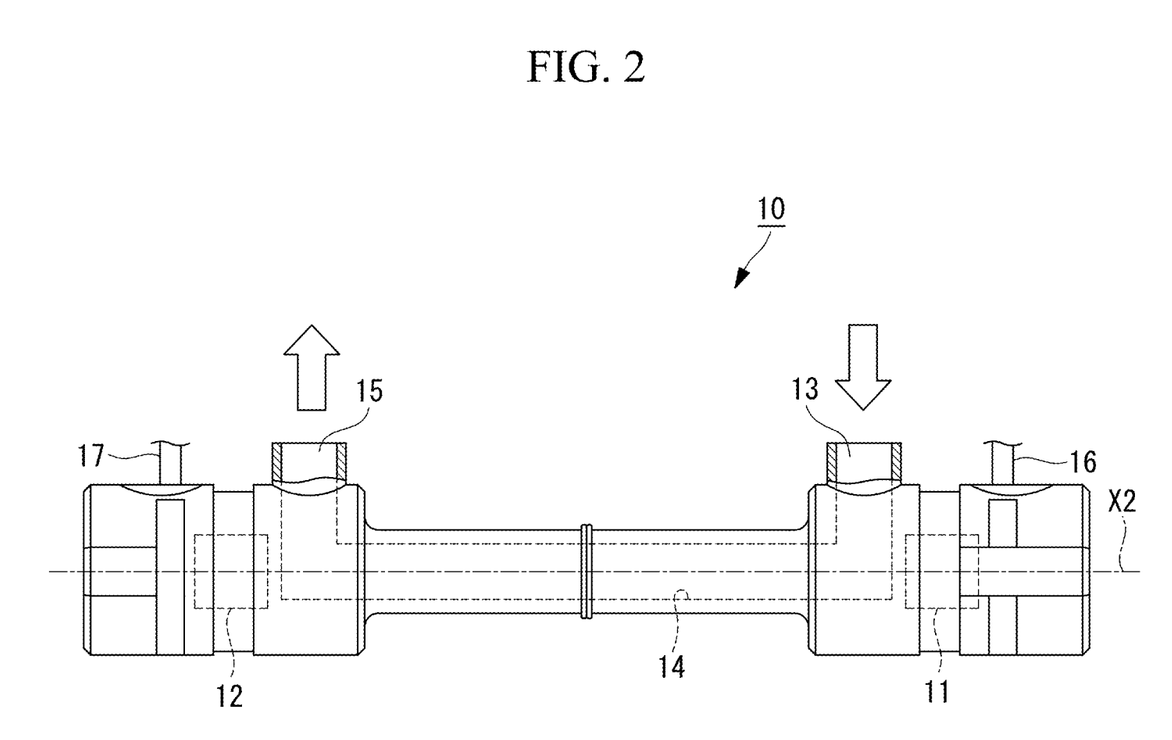
FIG. 2 is a partial longitudinal sectional view illustrating an ultrasonic flow metering portion illustrated in FIG. 1.

A flow rate adjusting device 100 according to an embodiment of the present disclosure will be described with reference to the drawings. FIG. 1 is a partial longitudinal sectional view illustrating one embodiment of a flow rate adjusting device. FIG. 2 is a partial longitudinal sectional view illustrating an ultrasonic flow metering portion illustrated in FIG. 1.

The flow rate adjusting device 100 of this embodiment shown in FIG. 1 includes: an ultrasonic flow metering portion 10 which measures a flow rate of a fluid flowing into a straight tube-shaped measurement flow channel 14 from an inflow port 100*a* and circulated through the measurement flow channel 14; a flow rate adjusting portion 20 which adjusts the flow rate of the fluid; a control device 30 which controls the flow rate adjusting portion 20; a housing portion 40 which accommodates the ultrasonic flow metering portion 10, the flow rate adjusting portion 20, the control device 30; an inflow-side flow channel portion 50 which guides the fluid flowing in from the inflow port 100*a* to an upstream side of the measurement flow channel 14; an outflow-side flow channel portion 60 which guides the fluid flowing out from a downstream side of the measurement flow channel 14 to an outflow port 100*b*; and a pressure sensor (pressure measuring portion) 70.

The fluid whose flow rate is adjusted by the flow rate adjusting device 100 of this embodiment is, for example, a liquid such as a drug solution or pure water used for semiconductor manufacturing devices. The temperature of the fluid is, for example, a temperature in an ordinary temperature range (for example, 10° C. or higher and lower than 50° C.) or a high-temperature range (for example, 50° C. or higher and 80° C. or lower).

The housing portion 40 of the flow rate adjusting device 100 is fixed to an installation surface S with fastening bolts (not shown). The flow rate adjusting device 100 is connected to an external device (not shown) via a cable 200, is supplied with power from the external device via the cable 200 and transmits various signals to the external device and receives various signals therefrom.

Examples of the signals received from the external device include a signal indicating a set value of a target flow rate adjusted by the flow rate adjusting device 100. Examples of the signals transmitted to the external device include a signal indicating the flow rate of the fluid calculated by the control device 30 on the basis of a signal measured by the ultrasonic flow metering portion 10, and a signal indicating the pressure of the fluid measured by the pressure sensor 70.

The ultrasonic flow metering portion 10 measures a propagation time difference between ultrasonic waves transmitted by a pair of oscillators, i.e., an upstream side oscillator 11 disposed at the upstream side of the measurement flow channel 14 and a downstream side oscillator 12 disposed at the downstream side of the measurement flow channel 14, so as to obtain the flow rate of the fluid which flows in from an inflow-side pipe (not shown) and is circulated through the straight tube-shaped measurement flow channel 14.

As shown in FIG. 2, the ultrasonic flow metering portion 10 includes: the upstream side oscillator 11 and the downstream side oscillator 12 which are disposed on an axis line X2 that is parallel to the installation surface S; an inflow channel 13 which is connected to the inflow-side flow channel portion 50; the straight tube-shaped measurement flow channel 14 which is connected to the inflow channel 13 and extends along the axis line X2 (second axis line); and an outflow channel 15 which is connected to the outflow-side flow channel portion 60. The axis line X2 is parallel to an axis line X1 (first axis line) in which a valve body portion 21, which is described later, advances or recedes.

The upstream side oscillator 11 and the downstream side oscillator 12 are disposed at positions opposed to each other across the measurement flow channel 14 on the axis line X2, and can transmit and receive ultrasonic wave signals. The ultrasonic wave signal transmitted from the upstream side oscillator 11 propagates through the fluid circulated through the measurement flow channel 14 and is received by the downstream side oscillator 12.

Similarly, the ultrasonic wave signal transmitted from the downstream side oscillator 12 propagates through the fluid circulated through the measurement flow channel 14 and is received by the upstream side oscillator 11. Since the fluid is circulated through the measurement flow channel 14 from the upstream side to the downstream side, a propagation time for the ultrasonic wave signal transmitted from the upstream side oscillator 11 to the downstream side oscillator 12 is shorter than a propagation time for the ultrasonic wave signal transmitted from the downstream side oscillator 12 to the upstream side oscillator 11. The ultrasonic flow metering portion 10 measures the flow rate of the fluid circulated through the measurement flow channel 14 by using a difference between the propagation times.

Note that the transmission of the ultrasonic wave signals by the upstream side oscillator 11 and the downstream side oscillator 12 is controlled by the control device 30 which is connected to the upstream side oscillator 11 and the downstream side oscillator 12 with signal lines 16 and 17, respectively, which are shown in FIG. 2. The ultrasonic wave signals received by the upstream side oscillator 11 and the downstream side oscillator 12 are transmitted to the control device 30 via the signal lines 16 and 17. As described later, the control device 30 calculates a difference between propagation times from transmission timings for the ultrasonic wave signals that are sent as instructions to the upstream side oscillator 11 and the downstream side oscillator 12 and reception timings for the ultrasonic wave signals received from the upstream side oscillator 11 and the downstream side oscillator 12 according to the transmission timings, and also calculates the flow rate of the fluid from the calculated difference between propagation times.

The flow rate adjusting portion 20 adjusts the flow rate of the fluid flowing out to the outflow port 100b which is connected to an outflow-side pipe (not shown) via the outflow-side flow channel portion 60 from the downstream side of the measurement flow channel 14. As shown in FIG. 1, the flow rate adjusting portion 20 is disposed between the ultrasonic flow metering portion 10 and the control device 30 in an axis line Y direction corresponding to an installation direction orthogonal to the installation surface S. As shown in FIG. 1, in the axis line Y direction, the ultrasonic flow metering portion 10 is disposed at a position closest to the installation surface S, and the control device 30 is disposed at a position farthest from the installation surface S. The flow rate adjusting portion 20 is disposed between the ultrasonic flow metering portion 10 and the control device 30.

Figure 3:
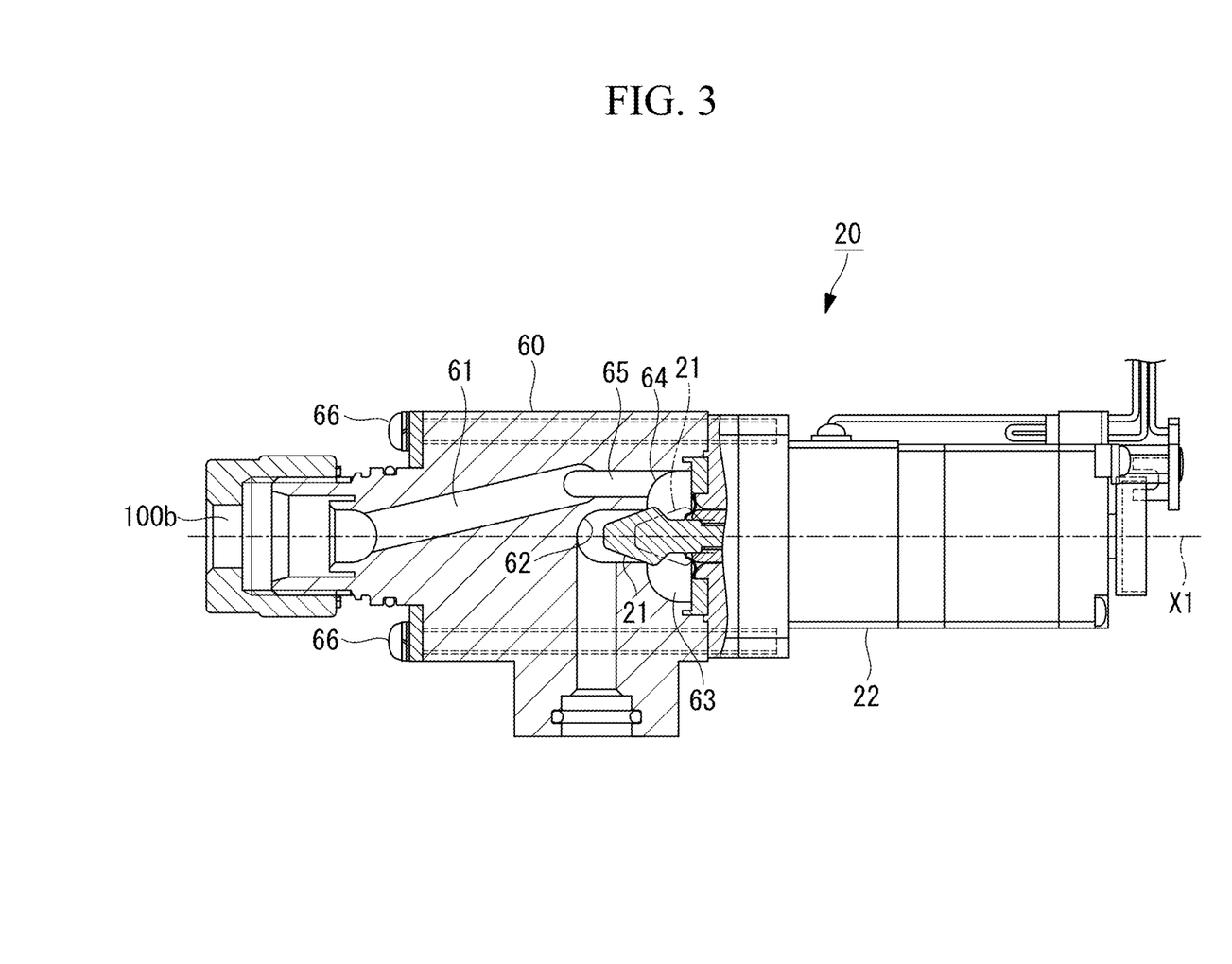
FIG. 3 is a partial longitudinal sectional view illustrating a flow rate adjusting portion and an outflow side flow channel portion illustrated in FIG. 1.

FIG. 3 is a partial longitudinal sectional view illustrating a flow rate adjusting portion 20 and an outflow side flow channel portion 60 illustrated in FIG. 1. As shown in FIG. 3, the flow rate adjusting portion 20 includes the valve body portion 21 which is inserted into a valve hole 62 that is formed in the outflow-side flow channel portion 60; and an electric driving portion 22 which causes the valve body portion 21 to move along the axis line X1 (first axis line) parallel to the installation surface S in a direction closer to or away from the valve hole 62. The electric driving portion 22 causes the valve body portion 21 to advance or recede along the axis line X1 between a closed position indicated by a solid line shown in FIG. 4 and an open position indicated by a dashed line shown in FIG. 3. The flow rate adjusting portion 20 adjusts the amount of the fluid flowing into a valve chest 63 from the valve hole 62 in such a manner that the electric driving portion 22 adjusts the position of the valve body portion 21 on the axis line X1.

Figure 5:
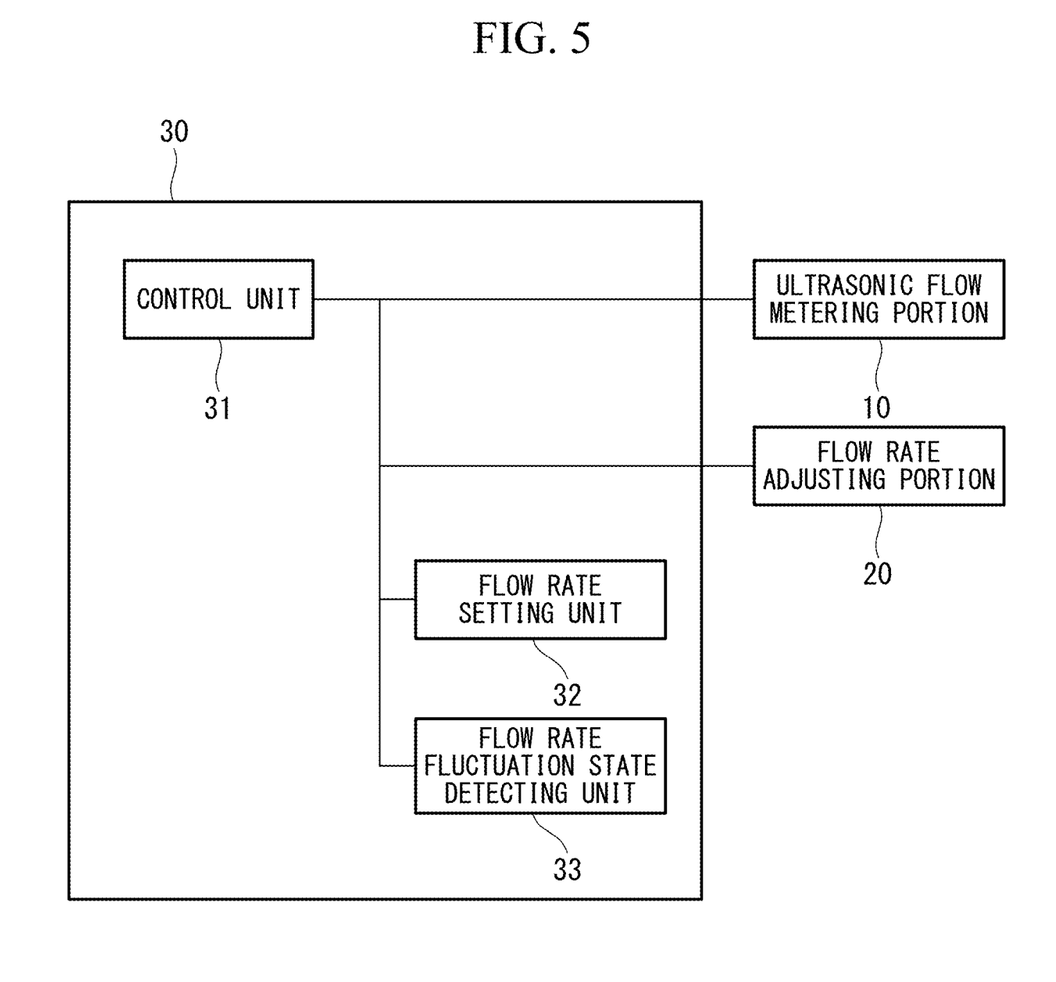
FIG. 5 is a block diagram illustrating a configuration of a control device.

The configuration of the control device 30 will now be described with reference to FIG. 5. FIG. 5 is a block diagram illustrating the configuration of the control device 30. As illustrated in FIG. 5, the control device 30 has a control unit 31, a flow rate setting unit 32, and a flow rate fluctuation state detecting unit 33.

The control unit 31 controls the flow rate adjusting portion 20 based on a measured flow rate value FRac of a fluid measured by the ultrasonic flow metering portion 10. The control unit 31 controls the flow rate adjusting portion 20 so as to move the valve body 21 by a motion amount in accordance with a flow rate difference between the measured flow rate value FRac and a set flow rate value FRset so that the flow rate of a fluid measured by the ultrasonic flow metering portion 10 is the set flow rate value FRset set by the flow rate setting unit 32.

The control portion 31 can instruct the upstream side oscillator 11 and the downstream side oscillator 12, respectively, which are included in the ultrasonic flow metering portion 10, to transmit ultrasonic wave signals. Further, the control portion 31 can detect a timing when the ultrasonic wave signal transmitted from one of the upstream side oscillator 11 and the downstream side oscillator 12 is received by the other one of the upstream side oscillator 11 and the downstream side oscillator 12.

The control portion 31 calculates a first propagation time from the transmission timing for the ultrasonic wave signal that is sent as an instruction to the downstream side oscillator 12 and the reception timing for the ultrasonic wave signal received by the upstream side oscillator 11 according to the transmission timing. Further, the control portion 31 calculates a second propagation time from the transmission timing for the ultrasonic wave signal that is sent as an instruction to the upstream side oscillator 11 and the reception timing for the ultrasonic wave signal received by the downstream side oscillator 12 according to the transmission timing. The control portion 31 obtains the flow rate of the fluid circulated through the measurement flow channel 14 on the basis of a predetermined flow rate arithmetic expression and a propagation time difference obtained by subtracting the second propagation time from the first propagation time.

The flow rate setting unit 32 sets a set flow rate value FRset [ml/min] included in a flow rate range of the minimum flow rate, 0 [ml/min], to the maximum flow rate FRmax [ml/min] of the flow rate adjusting device 100. For example, the flow rate setting unit 32 sets the set flow rate value FRset based on a flow rate setting signal received by the control device 30 from an external device via the cable 200.

The flow rate fluctuation state detecting unit 33 detects a flow rate fluctuation state where a first flow rate state and a second flow rate state occur multiple times, respectively, the first flow rate state is a state where the measured flow rate value FRac [ml/min] measured by the ultrasonic flow metering portion 10 is higher by at least a first threshold Th1 than the set flow rate value FRset, and the second flow rate state is a state where the measured flow rate value FRac is lower by at least a second threshold Th2 than the set flow rate value FRset.

As shown in FIG. 1, the housing portion 40 is provided with an air introduction port 40a and an air discharge port 40b which are formed in order from the side close to the installation surface S along the axis line Y. The air introduction port 40a is a port for guiding an air supplied from an air supply source (not shown) into the housing portion 40. The air discharge port 40b is a port for discharging the air circulated in the housing portion 40 to the outside of the housing portion 40.

Figure 4:
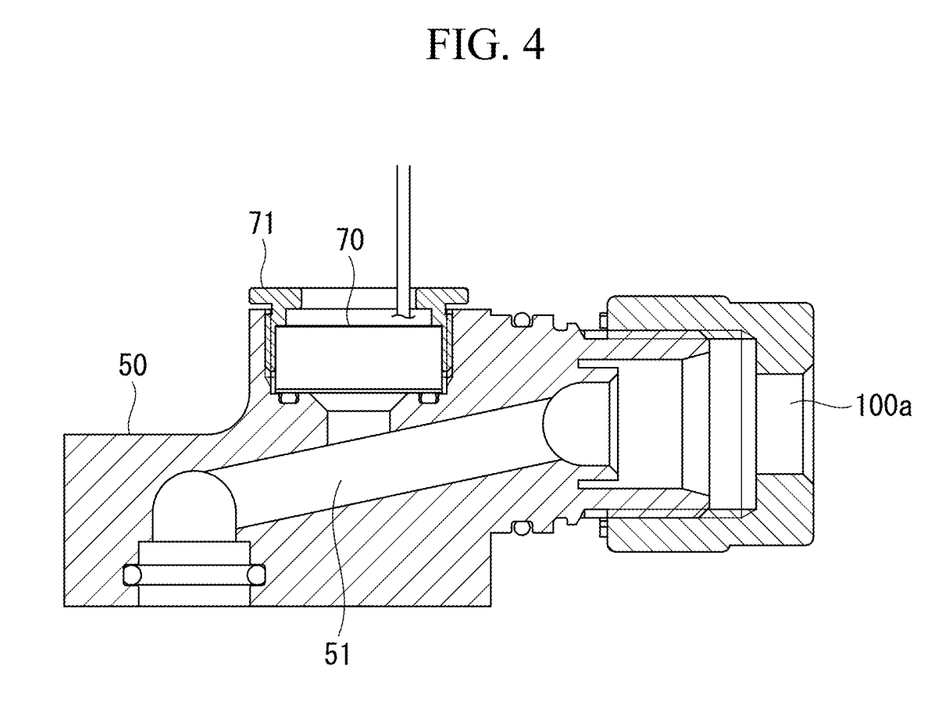
FIG. 4 is a longitudinal sectional view illustrating an inflow side flow channel portion and a pressure sensor illustrated in FIG. 1.

FIG. 4 is a longitudinal sectional view illustrating an inflow side flow channel portion 50 and a pressure sensor 70 illustrated in FIG. 1. As shown in FIGS. 1 and 4, the inflow-side flow channel portion 50 is a member in which an inflow-side inclined flow channel 51 that is inclined in a direction approaching the installation surface S from the inflow port 100a to the upstream side inflow channel 13 of the measurement flow channel 14 is formed inside. The inflow-side flow channel portion 50 is provided with the pressure sensor 70 for detecting the pressure of the fluid circulated through the inflow-side inclined flow channel 51.

As shown in FIGS. 1 and 3, the outflow-side flow channel portion 60 is a member in which an outflow-side inclined flow channel 61 that is inclined in a direction approaching the installation surface S from the flow rate adjusting portion 20 to the outflow port 100b is formed inside. The outflow-side flow channel portion 60 guides the fluid to the upstream side of the outflow-side inclined flow channel 61 via an outflow channel 65 from an opening 64 that is formed at an upper portion of the valve chest 63. The fluid guided to the upstream side of the outflow-side inclined flow channel 61 is further guided to the outflow port 100b along the outflow-side inclined flow channel 61. As shown in FIGS. 2 and 3, the outflow-side flow channel portion 60 is provided with through-holes through which a plurality of fastening bolts 66 penetrate. The outflow-side flow channel portion 60 is fixed to the electric driving portion 22 by fastening the fastening bolts 66 to the electric driving portion 22.

The pressure sensor 70 measures the pressure (supply pressure) of the fluid flowing into the inflow-side inclined flow channel 51 at the upstream side of the measurement flow channel 14 from the inflow port 100a. The pressure sensor 70 is, for example, a strain gauge pressure sensor. The pressure sensor 70 is attached to the inflow-side flow channel portion 50 by a sensor holder 71. A pressure signal indicating the pressure of the fluid measured by the pressure sensor 70 is transmitted to the control device 30 and stored in a storage portion (not shown) included in the control device 30. The pressure signal is transmitted to the external device via the cable 200.

Figure 6:
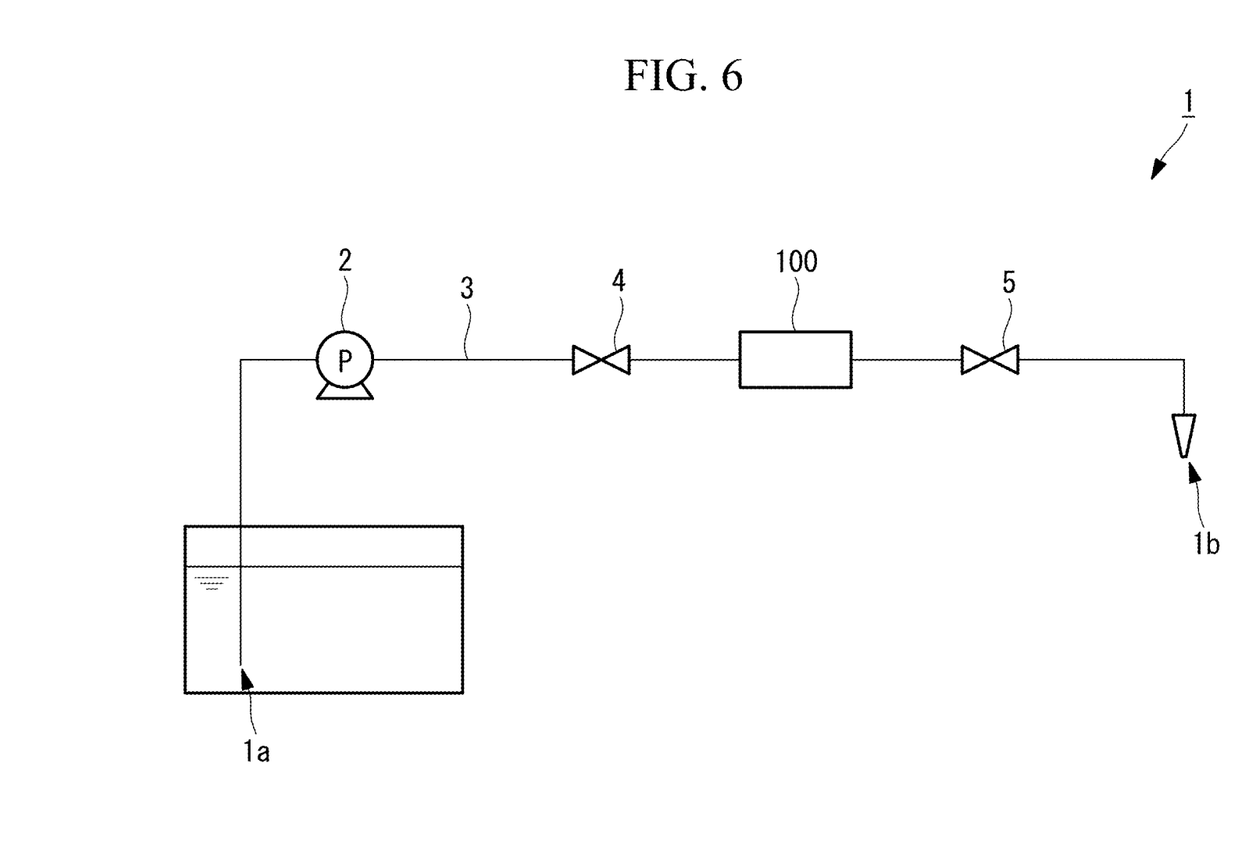
FIG. 6 is a schematic configuration diagram illustrating a flow rate adjusting system in which the flow rate adjusting device is installed.

Next, a flow rate adjusting system 1 in which the flow rate adjusting device 100 of the present embodiment is installed will be described with reference to FIG. 6. FIG. 6 is a schematic configuration diagram illustrating the flow rate adjusting system 1 in which the flow rate adjusting device 100 is installed. As illustrated in FIG. 6, the flow rate adjusting system 1 has a pump 2 configured to pressurize and feed a fluid, a piping 3 configured to convey a fluid from an inflow end 1a to an outflow end 1b, the flow rate adjusting device 100, an on-off valve 4 arranged in the piping 3 upstream of the flow rate adjusting device 100, and an on-off valve 5 arranged in the piping 3 downstream of the flow rate adjusting device 100.

The flow rate adjusting system 1 causes the pump 2 to pressurize and feed a fluid flowing into the piping 3 from the inflow end 1a to supply the fluid to the flow rate adjusting device 100 and supplies the fluid with the flow rate adjusted by the flow rate adjusting device 100 to the outflow end 1b. A state where a fluid is supplied from the inflow end 1a to the flow rate adjusting device 100 and a state where no fluid is supplied from the inflow end 1a to the flow rate adjusting device 100 are switched therebetween by the on-off valve 4. A state where a fluid is supplied from the flow rate adjusting device 100 to the outflow end 1b and a state where no fluid is supplied from the flow rate adjusting device 100 to the outflow end 1b are switched therebetween by the on-off valve 5.

Figure 7:
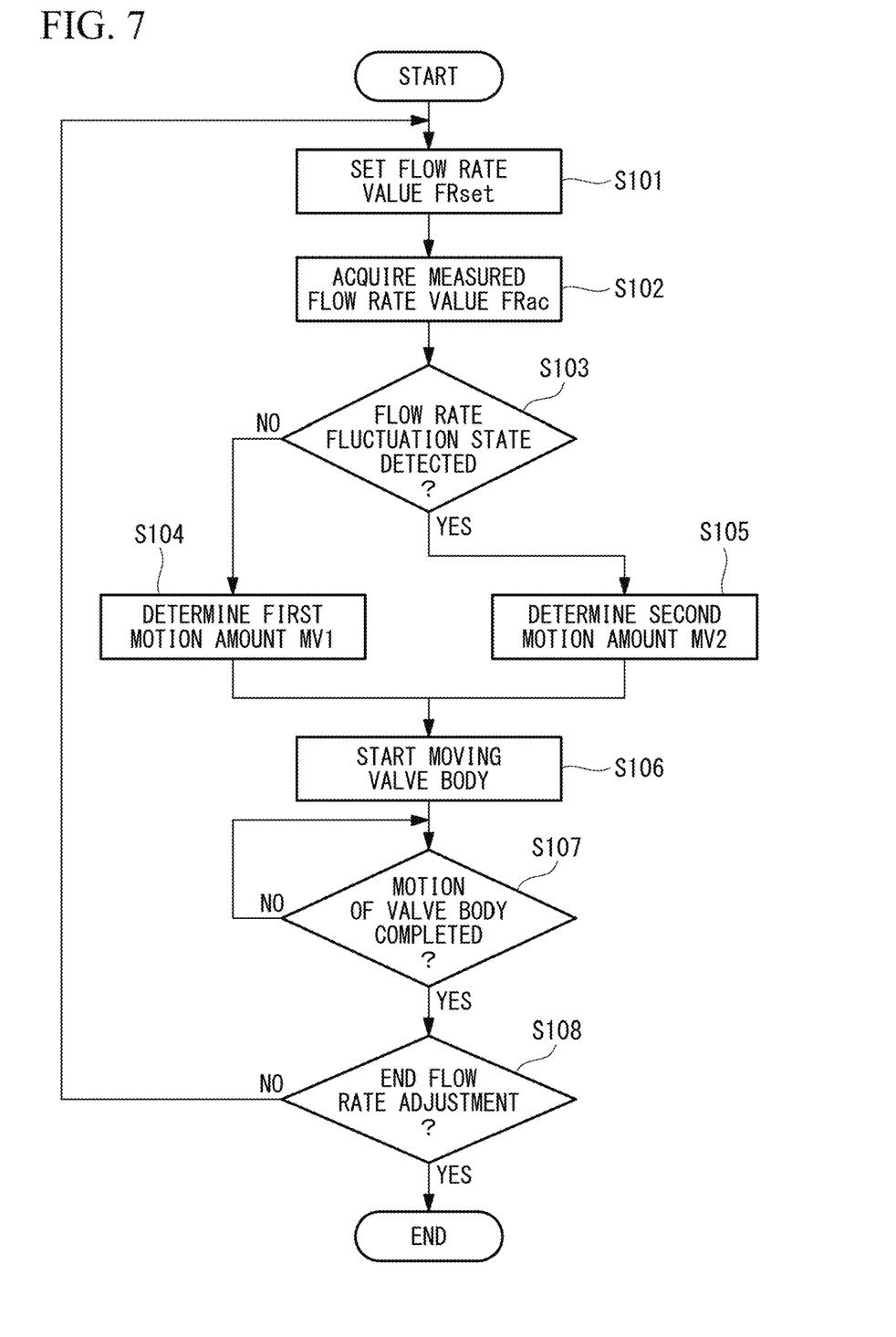
FIG. 7 is a flowchart illustrating a method of controlling a flow rate adjusting portion of the flow rate adjusting device of the present embodiment.

Next, the control method of the flow rate adjusting device 100 of the present embodiment will be described with reference to FIG. 7. FIG. 7 is a flowchart illustrating a method of controlling the flow rate adjusting portion 20 of the flow rate adjusting device 100 of the present embodiment. Each process illustrated in FIG. 7 is performed when the control device 30 executes a control program.

In step S101, the control unit 31 sets the set flow rate value FRset [ml/min] included in the flow rate range of the minimum flow rate, 0 [ml/min], to the maximum flow rate FRmax [ml/min] of the flow rate adjusting device 100. For example, the flow rate setting unit 32 sets the set flow rate value FRset based on a flow rate setting signal received by the control device 30 from an external device via the cable 200.

In step S102, the control unit 31 acquires the measured flow rate value FRac of a fluid flowing through the measurement flow channel 14 from the ultrasonic flow metering portion 10.

In step S103, the control unit 31 determines whether or not the flow rate fluctuation state is detected by the flow rate fluctuation state detecting unit 33 and, if the determination is YES, proceeds with the process to step S105 or, if the determination is NO, proceeds with the process to step S104.

In step S104, since this is the case where the flow rate fluctuation state is not detected by the flow rate fluctuation state detecting unit 33, the control unit 31 calculates a first motion amount MV1 of the valve body 21 in accordance with the following equation (1):

$$MV1 = (FRset - FRac) \times \alpha, \tag{1}$$

where $\alpha$ is a coefficient of a positive value.

In step S105, since this is the case where the flow rate fluctuation state is detected by the flow rate fluctuation state detecting unit 33, the control unit 31 calculates a second motion amount MV2 of the valve body 21 in accordance with the following equation (2):

$$MV2 = (FRset - FRac) \times \beta, \tag{2}$$

where $\beta$ is a coefficient of a positive value.

It is preferable to set $\beta$ to be greater than or equal to 0.2 times and less than or equal to 0.4 times of $\alpha$. For the same (FRset-FRac), which is the difference between the set flow rate value FRset and the measured flow rate value FRac, it is preferable to set the second motion amount MV2 to be greater than or equal to 0.2 times and less than or equal to 0.4 times of the first motion amount MV1.

In step S106, the control unit 31 controls the flow rate adjusting portion 20 to start an operation of moving the valve body 21 along the axis X1 by the first motion amount MV1 determined in step S104 or the second motion amount MV2 determined in step S105.

If the measured flow rate value FRac is smaller than the set flow rate value FRset, the first motion amount MV1 of the valve body 21 will be a positive value. When the first motion amount MV1 is a positive value, the control unit 31 moves the valve body 21 in a direction away from the valve hole 62 by the first motion amount MV1 to increase the flow rate of the fluid passing through the valve hole 62.

In contrast, if the measured flow rate value FRac is larger than the set flow rate value FRset, the first motion amount MV1 of the valve body 21 will be a negative value. When the first motion amount MV1 is a negative value, the control unit 31 moves the valve body 21 in a direction closer to the valve hole 62 by the first motion amount MV1 to reduce the flow rate of the fluid passing through the valve hole 62.

In step S107, the control unit 31 determines whether or not the motion of the valve body 21 is completed because the motion amount of the valve body 21 reaches the first motion amount MV1 determined in step S104 or the second motion amount MV2 determined in step S105 and, if the determination is YES, proceeds with the process to step S108 or, if the determination is NO, performs step S107 again.

In step S108, the control unit 31 determines whether or not to end the flow rate adjustment of the fluid performed by the flow rate adjusting portion 20 and, if the determination is YES, ends the process of the present flowchart or, if the determination is NO, performs the process of step S101 again.

Figure 8:
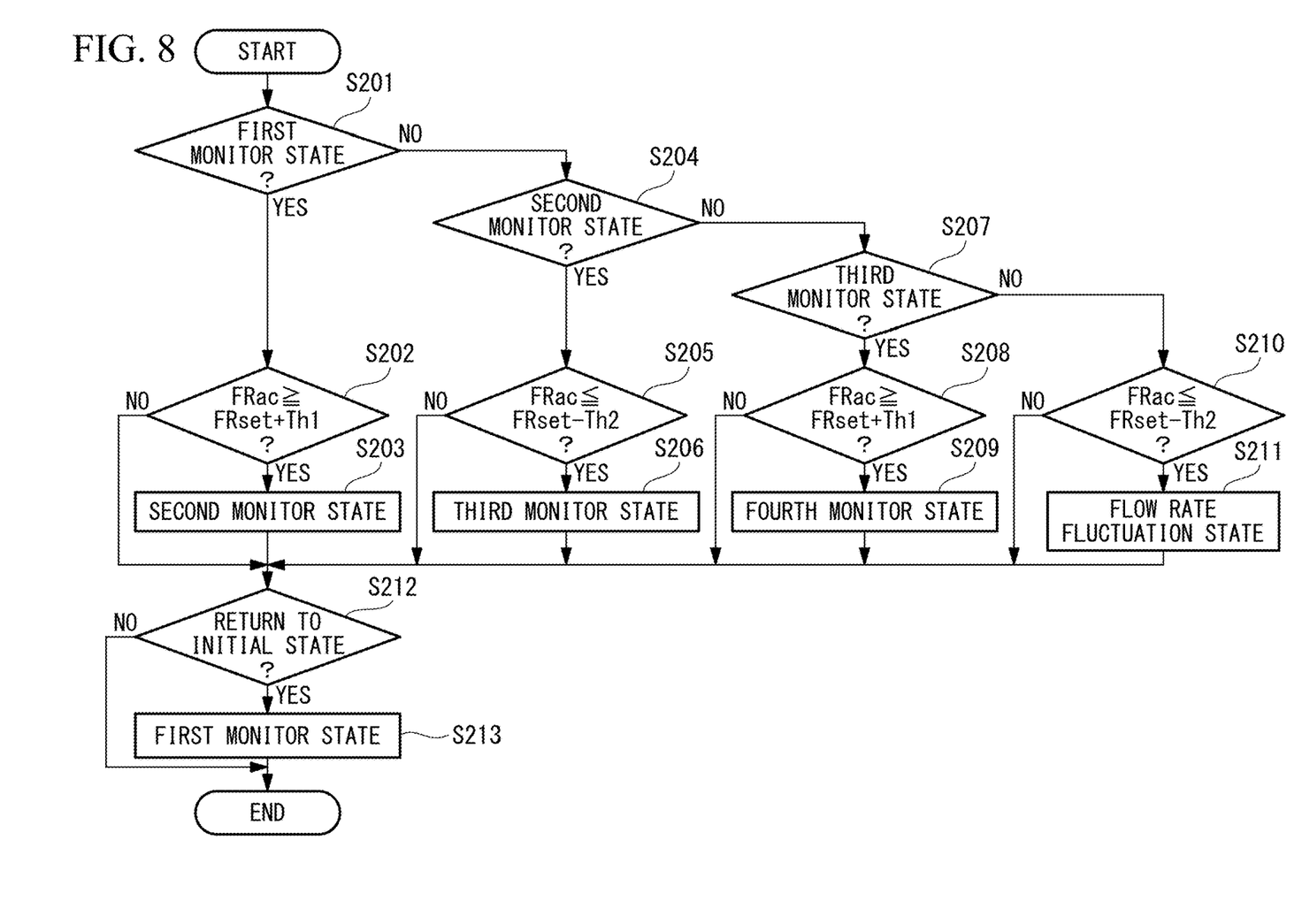
FIG. 8 is a flowchart illustrating a method of detecting a flow rate fluctuation state performed by a flow rate fluctuation state detecting unit.
Figure 9:
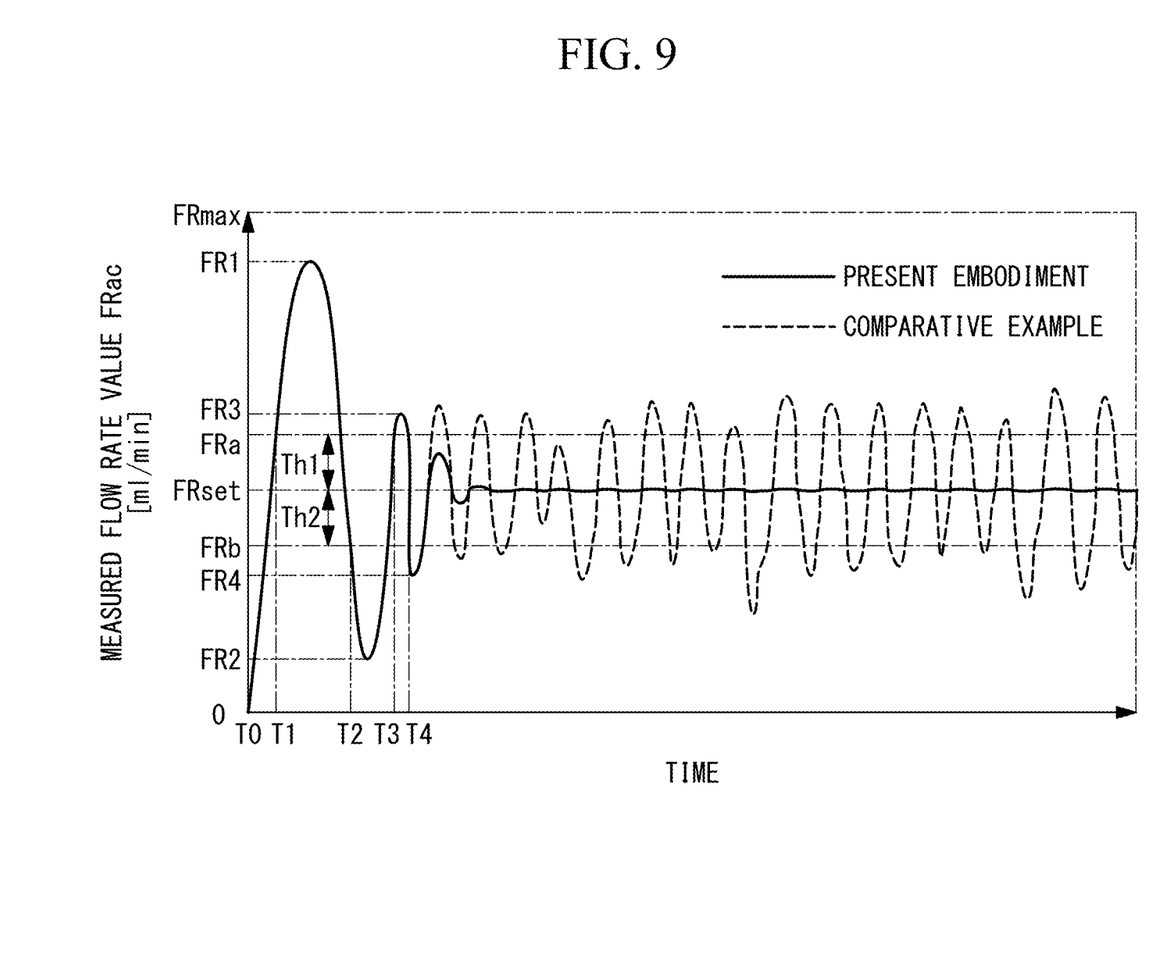
FIG. 9 is a graph illustrating an example of a change in the flow rate of a liquid adjusted by the flow rate adjusting device of the present embodiment.

Next, the method of detecting the flow rate fluctuation state performed by the flow rate fluctuation state detecting unit 33 will be described with reference to FIG. 8 and FIG. 9. FIG. 8 is a flowchart illustrating the method of detecting the flow rate fluctuation state performed by the flow rate fluctuation state detecting unit 33. FIG. 9 is a graph illustrating an example of a change in the flow rate of a liquid to be adjusted by the flow rate adjusting device 100 of the present embodiment.

In FIG. 9, values indicated by the solid line represent changes in the flow rate when a method of controlling the flow rate adjusting portion 20 illustrated in FIG. 7 of the present embodiment is performed, and values indicated by the dashed line represent changes in the measured flow rate value FRac when the control method of a comparative example is performed. The comparative example is an example in which the determination of step S103 illustrated in FIG. 7 is not performed and the first motion amount MV1 of step S104 is always determined as the motion amount of the valve body 21.

In FIG. 9, the first threshold Th1 and the second threshold Th2 are set to any values in a range that is greater than or equal to 5% and less than or equal to 10% of the flow rate range of a flow rate of 0 to the maximum flow rate of FRmax. The first threshold Th1 and the second threshold Th2 are thresholds set for detecting the flow rate fluctuation state where a phenomenon in which states where the measured flow rate value FRac is excessively larger and excessively smaller relative to the set flow rate value FRset are repeated (a hunching phenomenon) occurs.

As illustrated in FIG. 9, in both the present embodiment and the comparative example, from time T0 to time T4, a first flow rate state where the measured flow rate value FRac is higher by at least the first threshold Th1 than the set flow rate value FRset and a second flow rate state where the measured flow rate value FRac is lower by at least the second threshold Th2 than the set flow rate value FRset are repeated alternatingly twice, respectively.

In FIG. 9, time T0 represents the time of start of a flow rate adjusting operation on a liquid performed by the flow rate adjusting portion 20. Time T1 and time T3 each are the time the measured flow rate value FRac becomes the flow rate value FRa that is higher by the first threshold Th1 than the set flow rate value FRset. Time T2 and time T4 each are the time the measured flow rate value FRac becomes the flow rate value FRb that is lower by the second threshold Th2 than the set flow rate value FRset.

Although, in the present embodiment, the flow rate fluctuation state is detected when the first flow rate state and the second flow rate state have been repeated alternatingly twice, respectively, the period from the first detection of the first flow rate state to the second detection of the second flow rate state can be any length of period. That is, the flow rate fluctuation state detecting unit 33 of the present embodiment detects the flow rate fluctuation state when the first flow rate state and the second flow rate state have been repeated alternatingly twice, respectively, regardless of the length of the period from time T0 to time T4 illustrated in FIG. 9.

This is because, for example, an excessive amount of fluid relative to the opening of the valve body 21 of the flow rate adjusting portion 20 would flow in a state where the pressure in ejecting the liquid downstream of the flow rate adjusting device 100 (a back pressure) is excessively lower relative to the supply pressure of the liquid upstream of the flow rate adjusting device 100 (for example, the back pressure is lower by at least 400 KPa than the supply pressure).

In the comparative example, the state where the first flow rate state and the second flow rate state each occur multiple times continues even after time T4. In contrast, when the method of controlling the flow rate adjusting portion 20 illustrated in FIG. 7 of the present embodiment is performed, neither the first flow rate state nor the second flow rate state occurs after time T4, and the measured flow rate value FRac converges to a range that is higher than the flow rate value FRb and lower than the flow rate value FRa. Herein, the flow rate value FRa is a value of the set flow rate value FRset plus the first threshold Th1, and the flow rate value FRb is a value of the set flow rate value FRset minus the second threshold Th2.

The process illustrated in FIG. 8 is performed in parallel to the method of controlling the flow rate adjusting portion 20 of the flow rate adjusting device 100 illustrated in FIG. 7. The flow rate fluctuation state detected by the method of detecting the flow rate fluctuation state performed by the flow rate fluctuation state detecting unit 33 illustrated in FIG. 8 is used in the determination of step S103 of FIG. 7. In performing the process of FIG. 8, it is assumed that the ultrasonic flow metering portion 10 acquires measured flow rate values FRac sequentially at a predetermined time interval and the measured flow rate values FRac are transferred from the ultrasonic flow metering portion 10 to the flow rate fluctuation state detecting unit 33.

The flow rate fluctuation state detecting unit 33 sets a first monitor state indicating that the flow rate fluctuation state has not yet been detected as an initial state. Further, when the flow rate fluctuation state detecting unit 33 has detected the flow rate fluctuation state in step S103 of FIG. 7 and determined YES and ends the flow rate adjustment in step S108 to end the process of the flowchart of FIG. 7, the flow rate fluctuation state detecting unit 33 releases the flow rate fluctuation state and sets the first monitor state.

In step S201, the flow rate fluctuation state detecting unit 33 determines whether or not the first monitor state has been set and, if the determination is YES, proceeds with the process to step S202 or, if the determination is NO, proceeds with the process to step S204.

In step S202, the flow rate fluctuation state detecting unit 33 determines whether or not the first flow rate state where the measured flow rate value FRac is higher by at least the first threshold Th1 than the set flow rate value FRset has been established and, if the determination is YES, proceeds with the process to step S203 or, if the determination is NO, proceeds with the process to step S212. The flow rate gradually increases from the flow rate of 0 [ml/min] at time T0, and in response to the measured flow rate value FRac being higher by at least the first threshold Th1 than the set flow rate value FRset at time T1, the flow rate fluctuation state detecting unit 33 determines that the first flow rate state has been established.

In step S203, since it is determined that the first flow rate state has been established in the first monitor state, the flow rate fluctuation state detecting unit 33 sets a second monitor state as the monitor state of the measured flow rate value FRac.

In step S204, the flow rate fluctuation state detecting unit 33 determines whether or not the second monitor state has been set and, if the determination is YES, proceeds with the process to step S205 or, if the determination is NO, proceeds with the process to step S207.

In step S205, the flow rate fluctuation state detecting unit 33 determines whether or not the second flow rate state where the measured flow rate value FRac is lower by at least the second threshold Th2 than the set flow rate value FRset has been established and, if the determination is YES, proceeds with the process to step S206 or, if the determination is NO, proceeds with the process to step S212. After the flow rate has increased from the flow rate value FRa at time T1 to the flow rate value FR1, in response to the measured flow rate value FRac being lower by at least the second threshold Th2 than the set flow rate value FRset at time T2, the flow rate fluctuation state detecting unit 33 determines that the second flow rate state has been established.

In step S206, since it is determined that the second flow rate state has been established in the second monitor state, the flow rate fluctuation state detecting unit 33 sets a third monitor state as the monitor state of the measured flow rate value FRac.

In step S207, the flow rate fluctuation state detecting unit 33 determines whether or not the third monitor state has been set and, if the determination is YES, proceeds with the process to step S208 or, if the determination is NO, proceeds with the process to step S210.

In step S208, the flow rate fluctuation state detecting unit 33 determines whether or not the first flow rate state where the measured flow rate value FRac is higher by at least the first threshold Th1 than the set flow rate value FRset has been established and, if the determination is YES, proceeds with the process to step S209 or, if the determination is NO, proceeds with the process to step S212. After the flow rate has decreased from the flow rate value FRb at time T2 to the flow rate value FR2, in response to the measured flow rate value FRac being higher by at least the first threshold Th1 than the set flow rate value FRset at time T3, the flow rate fluctuation state detecting unit 33 determines that the first flow rate state has been established.

In step S209, since it is determined that the first flow rate state has been established in the third monitor state, the flow rate fluctuation state detecting unit 33 sets a fourth monitor state as the monitor state of the measured flow rate value FRac.

In step S210, the flow rate fluctuation state detecting unit 33 determines whether or not the second flow rate state where the measured flow rate value FRac is lower by at least the second threshold Th2 than the set flow rate value FRset has been established and, if the determination is YES, proceeds with the process to step S211 or, if the determination is NO, proceeds with the process to step S212. After the flow rate has increased from the flow rate value FRa at time T3 to the flow rate value FR3, in response to the measured flow rate value FRac being the flow rate value FRb that is lower by at least the second threshold Th2 than the set flow rate value FRset at time T4, the flow rate fluctuation state detecting unit 33 determines that the second flow rate state has been established. The measured flow rate value FRac further decreases from the flow rate value FRb after time T4 has elapsed, bottoms out at the flow rate value FR4, and then increases.

In step S211, since the flow rate fluctuation state detecting unit 33 has determined that the first flow rate state and the second flow rate state have been repeated alternatingly twice, respectively, the flow rate fluctuation state detecting unit 33 sets the flow rate fluctuation state. In response to the occurrence of fluctuations of the measured flow rate value FRac in the order of the first flow rate state, the second flow rate state, the first flow rate state, and the second flow rate state, the flow rate fluctuation state detecting unit 33 of the present embodiment detects the flow rate fluctuation state.

In step S212, the flow rate fluctuation state detecting unit 33 determines whether or not to return the monitor state to the first monitor state that is the initial state and, if the determination is YES, proceeds with the process to step S213 or, if the determination is NO, ends the process of the present flowchart and repeats the process from step S201 again. When the flow rate adjustment ends in step S108 of FIG. 7 or when the flow rate setting unit 32 changes the set flow rate value FRset in step S101 of FIG. 7, the flow rate fluctuation state detecting unit 33 determines YES in step S212.

In step S213, when the second monitor state, the third monitor state, the fourth monitor state, or the flow rate fluctuation state has been set, the flow rate fluctuation state detecting unit 33 releases the set state and sets the first monitor state.

In the process illustrated in FIG. 8, although the flow rate fluctuation state detecting unit 33 detects the flow rate fluctuation state when the first flow rate state and the second flow rate state are repeated alternatingly twice, respectively, other forms may be employed. For example, the flow rate fluctuation state detecting unit 33 may detect the flow rate fluctuation state when the first flow rate state and the second flow rate state each occur only once. Further, the flow rate fluctuation state detecting unit 33 may detect the flow rate fluctuation state when the first flow rate state and the second flow rate state occur alternatingly any set number of times that is three or greater, respectively.

The effects and advantages achieved by the flow rate adjusting device 100 of the present embodiment described above will be described.

According to the flow rate adjusting device 100 of the present embodiment, when the flow rate fluctuation state is not detected by the flow rate fluctuation state detecting unit 33, the control unit 31 controls the flow rate adjusting portion 20 so as to move the valve body 21 by the first motion amount MV1. In contrast, when the flow rate fluctuation state is detected by the flow rate fluctuation state detecting unit 33, the control unit 31 controls the flow rate adjusting portion 20 so as to move the valve body 21 by the second motion amount MV2 that is less than the first motion amount MV1. Since the second motion amount MV2 of the valve body 21 when the flow rate fluctuation state is detected by the flow rate fluctuation state detecting unit 33 is less than the first motion amount MV1 of the valve body 21 when the flow rate fluctuation state is detected by the flow rate fluctuation state detecting unit 33, the change in the flow rate of a liquid flowing through the measurement flow channel 14 is reduced, and adjustment is made so that the first flow rate state and the second flow rate state where the measured flow rate value FRac is excessively larger and excessively smaller, respectively, relative to the set flow rate value FRset set in advance are not repeated. Thus, even in a state where the pressure in ejecting a liquid downstream of the flow rate adjusting device 100 (a back pressure) is excessively lower relative to the supply pressure of a liquid upstream of the flow rate adjusting device 100, the measured flow rate value FRac can be suitably converged to the set flow rate value FRset.

In the flow rate adjusting device 100 of the present embodiment, the flow rate fluctuation state is a state where the first flow rate state and the second flow rate state are repeated alternatingly.

According to the flow rate adjusting device 100 of the present embodiment, by detecting, as the flow rate fluctuation state, a state where the first flow rate state and the second flow rate state are repeated alternatingly, it is possible to prevent repetition of the first flow rate state and the second flow rate state where the measured flow rate value FRac is excessively larger and excessively smaller, respectively, relative to the set flow rate value FRset set in advance.

In the flow rate adjusting device 100 of the present embodiment, the first threshold Th1 and the second threshold Th2 are set to be greater than or equal to 5% and less than or equal to 10% of the flow rate range.

According to the flow rate adjusting device 100 of the present embodiment, by setting the first threshold Th1 and the second threshold Th2 to be greater than or equal to 5% and less than or equal to 10% of the flow rate range in which the set flow rate value FRset is set, it is possible to suitably detect the first flow rate state and the second flow rate state where the measured flow rate value FRac is excessively larger and excessively smaller, respectively, relative to the set flow rate value FRset set in advance.

In the flow rate adjusting device 100 of the present embodiment, in response to the flow rate setting unit 32 changing the set flow rate value FRset, the flow rate fluctuation state detecting unit 33 releases the state for detecting the flow rate fluctuation state.

According to the flow rate adjusting device 100 of the present embodiment, in response to the flow rate setting unit 32 changing the set flow rate value FRset, the state for detecting the flow rate fluctuation state is released. Thus, the flow rate fluctuation state detecting unit 33 can detect the flow rate fluctuation state again in accordance with the changed set flow rate value FRset.

In the flow rate adjusting device 100 of the present embodiment, the second motion amount MV2 is 0.2 times or greater and 0.4 times or less of the first motion amount MV1.

According to the flow rate adjusting device 100 of the present embodiment, because the second motion amount MV2 is 0.2 times or greater and 0.4 times or less of the first motion amount MV1, the second motion amount MV2 of the valve body 21 when the flow rate fluctuation state is detected by the flow rate fluctuation state detecting unit 33 can be suitably reduced relative to the first motion amount MV1, and the fluctuation of the measured flow rate value FRac can be suppressed.

What is claimed is:

1. A flow rate adjusting device comprising:
   a flow metering portion configured to measure a flow rate of a liquid flowing into a measurement flow channel from an inflow port and flowing through the measurement flow channel;
   a flow rate adjusting portion configured to move a valve body along an axis in a direction closer to or away from a valve hole to adjust a flow rate of a liquid flowing out from downstream of the measurement flow channel to an outflow port;
   a flow rate setting unit configured to set a set flow rate value included in a flow rate range of a minimum flow rate to a maximum flow rate;
   a flow rate fluctuation state detecting unit configured to detect a flow rate fluctuation state where a first flow rate state and a second flow rate state occur, the first flow rate state being a state where a measured flow rate value measured by the flow metering portion is higher by at least a first threshold than the set flow rate value, and the second flow rate state being a state where the measured flow rate value is lower by at least a second threshold than the set flow rate value; and
   a control unit configured to control the flow rate adjusting portion so as to move the valve body by a motion amount in accordance with a flow rate difference between the measured flow rate value and the set flow rate value so that the measured flow rate value measured by the flow metering portion is the set flow rate value,
   wherein the control unit controls the flow rate adjusting portion so as to move the valve body by a first motion amount as the motion amount when the flow rate fluctuation state is not detected by the flow rate fluctuation state detecting unit, and the control unit controls the flow rate adjusting portion so as to move the valve body by a second motion amount as the motion amount, the second motion amount being less than the first motion amount, when the flow rate fluctuation state is detected by the flow rate fluctuation state detecting unit.

2. The flow rate adjusting device according to claim 1, wherein the flow rate fluctuation state is a state where the first flow rate state and the second flow rate state are repeated alternatingly.

3. The flow rate adjusting device according to claim 2, wherein the first threshold and the second threshold are set to be greater than or equal to 5% and less than or equal to 10% of the flow rate range.

4. The flow rate adjusting device according to claim 1, wherein in response to the flow rate setting unit changing the set flow rate value, the flow rate fluctuation state detecting unit releases a state for detecting the flow rate fluctuation state.

5. The flow rate adjusting device according to claim 1, wherein the second motion amount is 0.2 times or greater and 0.4 times or less of the first motion amount.

6. A control method of a flow rate adjusting device, wherein the flow rate adjusting device has
- a flow metering portion configured to measure a flow rate of a liquid flowing into a measurement flow channel from an inflow port and flowing through the measurement flow channel,
- a flow rate adjusting portion configured to move a valve body along an axis in a direction closer to or away from a valve hole to adjust a flow rate of a liquid flowing out from downstream of the measurement flow channel to an outflow port, and
- a flow rate setting unit configured to set a set flow rate value included in a flow rate range of a minimum flow rate to a maximum flow rate, the control method comprising:
- a flow rate fluctuation state detection step of detecting a flow rate fluctuation state where a first flow rate state and a second flow rate state occur multiple times, the first low rate state being a state where a measured flow rate value measured by the flow metering portion is higher by at least a first threshold than the set flow rate value, and the second flow rate state being a state where the measured flow rate value is lower by at least a second threshold than the set flow rate value; and
- a control step of controlling the flow rate adjusting portion so that the measured flow rate value measured by the flow metering portion is the set flow rate value, wherein when the flow rate fluctuation state is not detected in the flow rate fluctuation state detection step, the flow rate adjusting portion is controlled in the control step so as to move the valve body by a first motion amount, the first motion amount being in accordance with a flow rate difference between the measured flow rate value and the set flow rate value, and when the flow rate fluctuation state is detected in the flow rate fluctuation state detection step, the flow rate adjusting portion is controlled in the control step so as to move the valve body by a second motion amount, the second motion amount being less than the first motion amount.

7. The control method of the flow rate adjusting device according to claim 6, wherein the flow rate fluctuation state is a state where the first flow rate state and the second flow rate state are repeated alternatingly.

8. The control method of the flow rate adjusting device according to claim 6, wherein the first threshold and the second threshold are set to be greater than or equal to 5% and less than or equal to 10% of the flow rate range.

9. The control method of the flow rate adjusting device according to claim 6, wherein in the flow rate fluctuation state detection step, in response to the flow rate setting unit changing the set flow rate value, a state for detecting the flow rate fluctuation state is switched to a state for not detecting the flow rate fluctuation state.

10. The control method of the flow rate adjusting device according to claim 6, wherein the second motion amount is 0.2 times or greater and 0.4 times or less of the first motion amount.

* * * * *